(12) United States Patent
Fargo

(10) Patent No.: US 8,382,581 B2
(45) Date of Patent: Feb. 26, 2013

(54) ONLINE GAMING AND REWARDS SYSTEM

(75) Inventor: Brian Fargo, Newport Beach, CA (US)

(73) Assignee: inXile Entertainment, Inc., Newport Beach, CA (US)

( * ) Notice: Subject to any disclaimer, the term of this patent is extended or adjusted under 35 U.S.C. 154(b) by 1158 days.

(21) Appl. No.: 11/959,162

(22) Filed: Dec. 18, 2007

(65) Prior Publication Data
US 2009/0156310 A1 Jun. 18, 2009

(51) Int. Cl.
A63F 9/24 (2006.01)
(52) U.S. Cl. .......................... 463/25; 463/42
(58) Field of Classification Search ............... 463/16, 463/25, 42
See application file for complete search history.

(56) References Cited

U.S. PATENT DOCUMENTS

| | | | |
|---|---|---|---|
| 5,816,918 A * | 10/1998 | Kelly et al. | 463/16 |
| 2004/0259630 A1 | 12/2004 | Huard et al. | |
| 2006/0148551 A1 * | 7/2006 | Walker et al. | 463/16 |
| 2006/0287051 A1 | 12/2006 | Katz et al. | |

* cited by examiner

Primary Examiner — Omkar Deodhar
(74) Attorney, Agent, or Firm — Hani Z. Sayed; Rutan & Tucker, LLP

(57) ABSTRACT

A system and method for rewarding and providing real world rewards for online game participation is provided. The system allows a user to access an online website having a plurality of different games to play or other activities to participate in, whereby the online website is able to track and monitor online participation and award points that may be redeemed for physical prizes that may be sent to the individual participating in the online activity. Additionally, the system allows the user to accumulate a sufficient amount of points which may be redeemed for better prizes after prolonged play and utilization of the online activity. Moreover, the system may reward the individual for specific contributions or reward for superior activity or play within the participation activity.

20 Claims, 2 Drawing Sheets

ONLINE GAMING AND REWARDS SYSTEM

FIELD OF THE INVENTION

The present invention relates generally to the field of online gaming. More specifically, the present invention relates to a system and a method for rewarding online gamers for continued play and facilitation of real world rewards for online play.

BACKGROUND OF THE INVENTION

Online gaming has become a very popular activity for many individuals. The ability for an individual to play games, interact with other individuals and to have access to entertainment from one's own home has been a major draw. Additionally, with the advent of online gambling, an individual may play Casino games from their home without needing to actually go to a casino to gamble. The ability to wager real life money in an online atmosphere has also driven this huge industry. A player may wager money from a credit card or from a bank account and may play these online games as if they were sitting in a casino. If the player wins money, that money may be linked to their account and/or credited to the individual's credit card number.

Many different online websites offer different types of game play including traditional games such as solitaire, poker and the like. These websites allow an individual to log on and play the games either by themselves or play as a collective group with others. These websites also allow the individual to play with many other players located at distant locations around the globe. Moreover, the individual has the ability to play a plurality of different games without the need for a physical game board which is often required in the real world application of the same game. Thereby the individual may skip from game to game without the need to pack and unpack the appropriate games. This gives the individual much more freedom to play multiple different games and the desire to play more games than would normally be done by the individual.

However, many times, this impersonal interaction with a computer/internet game is not very fulfilling. Additionally, the desire and reward for playing a particular game isn't the same as playing a real world game. For example, in a real world game, when playing with other individuals, there is typically banter and talk between the individuals, including body language and the like. This is absent from the online/virtual gaming world. Additionally, the rewards from winning an online game is much less tangible than from winning a real life game played with other individuals.

Many different online gaming systems allow an individual playing an online game to collect points for doing specific things in a game, winning a game or answering questions correctly. These points are accumulated by the individual and can represent a ranking against other individuals playing identical games. This ranking can give the individual a goal to work towards, but does not always stimulate the individual to play more games. Other online websites give real life rewards for contributing to the online website such as the submission of questions to be included into a game play.

However, a problem that exists is that there are no online gaming systems that give real world rewards for online play. As noted earlier, in order for an individual to receive a real world reward for online participation, it typically requires the individual to submit some tangible portion into the game or online site itself. No reward is given for merely playing the game or participating in the online site.

A need therefore exists for a system and a method that rewards an individual for online participation and/or play of an internet website wherein the individual may receive real world, tangible rewards for their participation and play. Additionally, a need therefore exists for a system and a method for rewarding an individual for online play and participation on an online website.

Moreover, a need exists for a system and method for calculating a reward to be sent to an individual for participating and playing online games.

SUMMARY OF THE INVENTION

The present invention relates to a system and method for rewarding and providing real world rewards for online game participation. The present invention allows a user to access an online website having a plurality of different games to play or other activities to participate in, whereby the online website is able to track and monitor online useage and award points that may be redeemed for physical prizes that may be sent to the individual participating in the online activity. Additionally, the present invention allows the user to accumulate a sufficient amount of points which may be redeemed for better prizes after prolonged play and usage of the online activity. Moreover, the system may reward the individual for specific contributions or rewards for superior activity or play within the activity being participated in.

To this end, in an exemplary embodiment of the present invention, a method of facilitating rewards for online participation is provided. The method comprises the steps of: providing to a user a login menu that is executed on a computer, wherein the login menu is programmed to acquire from a user a set of parameters for online use; displaying a participation menu that utilizes the set of parameters to allow the user to select a participation activity; providing a point furnishing system whereby a user is furnished with points during the activity; and displaying to a user a rewards menu for choice of a reward to the user.

In an exemplary embodiment, the method comprises the step of: setting of parameters with an identification outline.

In an exemplary embodiment, the method comprises: the set of parameters comprising a plurality of personal information from an individual user.

In an exemplary embodiment, the method comprises: a participation menu having a plurality of online activities to participate in.

In an exemplary embodiment, the method comprises: a participation menu having a plurality of online games to participate in.

In an exemplary embodiment, the method comprises: a point furnishing system that allows for accumulation of points in response to activity accomplishments.

In an exemplary embodiment, the method comprises: a point furnishing system that allows for accumulation of points in response to a user's continuous online participation in an online activity.

In an exemplary embodiment, the method comprises: a step of transferring information from the point furnishing system into the rewards menu such that information relating to points accumulated are displayed in the rewards menu.

In an exemplary embodiment, the method comprises: a rewards menu that allows a user to utilize points from the point furnishing system to pick a reward from the rewards menu.

In an exemplary embodiment, the method comprises: a rewards menu having a plurality of different rewards that may be won by an individual online user whereby each reward has a point amount associated therewith.

In an exemplary embodiment, the method comprises: allowing a user to pick a reward from the rewards menu and the points furnishing system deducts the points needed to redeem the reward from the points accumulated by an individual user.

In an exemplary embodiment, the method comprises: a rewards system that utilizes the login information received from the individual user to send the individual user the chosen reward.

In an exemplary embodiment, the method comprises: a reward is sent to the individual online user.

To this end, in an exemplary embodiment of the present invention, a system for rewarding online participation by an individual user is provided. The system comprises: an authentication and identification menu whereby an individual user may input personal information and characteristics and associating at least one of a plurality of said information to a participation menu whereby the participation menu reveals to the individual user certain activities to which they may participate. Additionally, the system may have a points system whereby points are allocated to the individual user for preset achievements and a rewards system whereby prizes may be chosen from a rewards menu.

In an exemplary embodiment, the system may allow the user to select a participation activity and transfer the individual to the selected activity.

In an exemplary embodiment, the system may have an authentication and identification menu that allows the user to identify personal likes and dislikes and whereby the system may forward this inputted information to the participation activity menu and the rewards system thereby designates information that corresponds to the inputted information from the user.

In an exemplary embodiment, the system may have a point system that allocates to the individual user points which may be accumulated by the individual user for preset achievements.

In an exemplary embodiment, the system may have a point system that allocates to a user points which may be accumulated by the individual user for preset achievements, where the preset achievements may be participation time, winning an activity, or answering a question correctly.

In an exemplary embodiment, the system may have a rewards system that may have a plurality of prizes corresponding to preset point totals whereby a prize may be selected by a user if the user has accumulated the necessary amount of points.

In an exemplary embodiment, the system may allow the user to accumulate points awarded by the points system to redeem the same for prizes in the rewards system and whereby when a prize is selected from the rewards system, the prize is sent to the individual user in exchange for the accumulated points.

To this end, in an exemplary embodiment of the present invention, a system and method for online participation by an individual is provided.

In another exemplary embodiment, a system and method for online participation is provided whereby the system may allow for rewards to be utilized to garner online participation by a user.

Another exemplary embodiment is a system and method for online participation whereby the system may utilize real world prizes to be awarded for online play.

Yet another exemplary embodiment of the present invention is to provide a system and method for online participation whereby the system may utilize real world prizes for online participation.

Still another exemplary embodiment of the present invention is to provide a system and method for online participation whereby the system may utilize a points system to determine rewards that are given to an individual for online participation.

An exemplary embodiment of the present invention is to provide a system and method for rewarding online participation whereby the system would be used for an individual playing an online game.

Yet another exemplary embodiment of the present invention is to provide a system and method for rewarding online participation whereby the system may be utilized for an individual playing and winning an online game.

Another exemplary embodiment of the present invention is to provide a system and method for rewarding online participation whereby the system may be utilized to reward an individual for participation in an online activity.

Still another exemplary embodiment of the present invention is to provide a system and a method for rewarding online participation whereby the system may track and monitor online usage by an individual.

Yet another exemplary embodiment of the present invention is to provide a system and a method for rewarding online participation whereby the system may reward continuous participation in an online activity even if the individual does not win the activity.

Still another exemplary embodiment of the present invention is to provide a system and a method for rewarding online participation whereby the system may reward continuous participation in an online activity and may reward the participation with a set amount of points which may be redeemed by the individual for real world prizes.

Another exemplary embodiment of the present invention is to provide a system and a method for rewarding online participation whereby the system may reward a certain level of play with a method of calculating a point system whereby the point system may be allocated to an individual user to receive and record said points from the point system.

An exemplary embodiment of the present invention is to provide a system and a method for rewarding online participation whereby the system may reward an individual for online participation by giving the individual points that can be redeemed for real world prizes.

Still another exemplary embodiment of the present invention is to provide a method for rewarding online participation whereby the system may reward an individual with the accumulation of online points that may be redeemed for real prizes.

Yet another exemplary embodiment of the present invention is to provide a system and method for rewarding online participation whereby the system may utilize a game to allow the user to accumulate points.

Still another exemplary embodiment of the present invention is to provide a system and method for rewarding online participation whereby the system may utilize any type of online activity including games, reading articles, puzzles, and the like whereby a participant's use of the system may be rewarded with a points system whereby the points system may be utilized for the redemption of the same for real world prizes.

Another exemplary embodiment of the present invention is to provide a system and a method for rewarding an individual for online participation whereby the user may receive points for online participation whereby the points may be traded and/or given to other individuals using the system.

Yet another exemplary embodiment of the present invention is to provide a system and a method for rewarding an individual for online participation whereby the user of the system may receive points for online participation in a game whereby the points may be traded, sold or given away to others for use in redeeming the points for a real world prize.

Still another exemplary embodiment of the present invention is to provide a system and a method for rewarding an individual for online participation in a game whereby the points may be traded, sold or given to others where they may be combined with the points of others in redeeming the total accumulation of points for a physical prize.

Another exemplary embodiment of the present invention is to provide a system and a method for rewarding an individual for online participation in a game whereby the points may be utilized to obtain a prize whereby the prizes may range depending on the amount of points redeemed.

Yet another exemplary embodiment of the present invention is to provide a system and a method for rewarding an individual for online participation in a game whereby the amount of points may correspond to certain prizes that may be obtained for that specific amount of points obtained by the individual during play.

Still another exemplary embodiment of the present invention is to provide a system and a method for rewarding an individual for online participation in a virtual participation game whereby points may be obtained by the individual for winning, finishing or achieving specific accomplishments that occur during participation in the game and whereby the accomplishments may be awarded a certain point total which may be applied towards a reward redeemable when desired by an individual.

Still another exemplary embodiment of the present invention is to provide a system and a method for online participation in a virtual game whereby the points given by the system may be limited to certain time periods in which they may be redeemed by the system.

Yet another exemplary embodiment of the present invention is to provide a system and a method for rewarding an individual for online participation in an online game whereby the system may allocate a specific real world prize for competing in or winning of the online game.

In yet another exemplary embodiment of the present invention is to provide a system and a method for rewarding an individual for online participation in an online game whereby the rewards may be provided by an advertiser who may pay a certain fee for use in connection with the online site.

Another exemplary embodiment of the present invention is to provide a system and a method for rewarding an individual for online participation in an online game whereby the real world rewards may be provided by a third party wherein the third party obtains the benefit of lower advertising costs in exchange for providing the real world prizes that are available to the online game players.

Still another exemplary embodiment of the present invention is to provide a system and a method for rewarding an individual for online participation in an online game whereby the real world rewards may be provided by a third party wherein the third party may exchange advertising space on the website where game play occurs for the real world prizes provided to the individual playing the online game.

Yet another exemplary embodiment of the present invention is to provide a system and a method for rewarding an individual for online participation in an online game whereby the prizes may be provided by a third party advertiser to the online site thereby allowing for targeted marketing of the prizes in conjunction with the online participation by the user.

Various objects, features, aspects and advantages of the present invention will become more apparent from the following detailed description of preferred embodiments of the invention, along with the accompanying drawings in which like numerals represent like components.

Additional features and advantages of the present invention are described herein, and will be apparent from the detailed description of the presently preferred embodiments and from the drawings.

DETAILED DESCRIPTION

Figure 1:
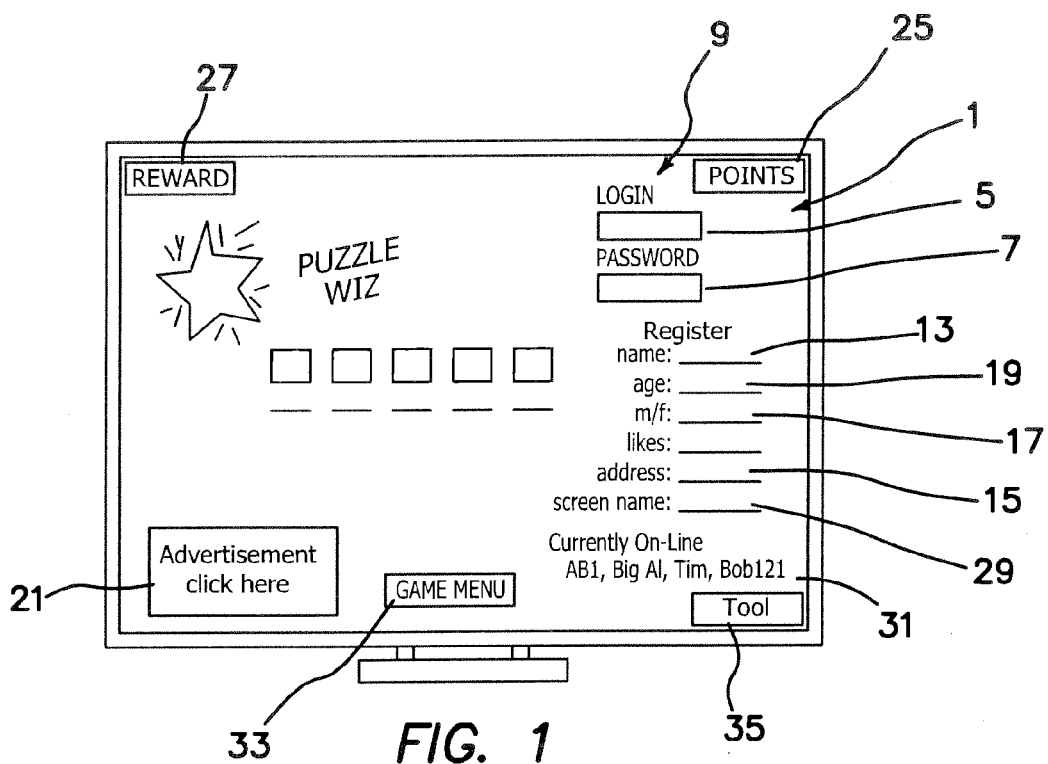
FIG. 1 is a screen shot of the system in an exemplary embodiment of the present invention.

Turning now to the drawings wherein elements are identified by numbers and like elements are identified by like numbers throughout the 4 figures, the invention is depicted in FIG. 1 and illustrates a system and a method for rewarding participation in an online activity.

Referring first to FIG. 1, as illustrated, an individual may wish to participate in an online activity 1. To further illustrate an online activity 1, and for purpose of illustration, in an exemplary embodiment, an online gaming activity has been selected. However, it should be understood that any online activity, including reading, quizzes, puzzles, and any other interactive type activity may be utilized by the embodied system and method for rewarding the individual user with real world prizes. In an exemplary embodiment, an individual may participate in an online game 3 whereby the individual will log 5 into the online website. The online website may require authentication 7 and a unique identification for each individual to identify each said individual user. This required identification and authorization 7 portion may be a login menu 9. The login menu 9 may allow new users to register 11 at the website whereby when notified that the individual user is a new user, the login menu 5 will prompt a new user (not shown) menu which requires the user to input identification and personal information, such as name 13, address 15 and personal characteristics such as gender 17 and age 19. The input identification and personal information may toggle the system to identify certain information relating to each individual user and may prompt specific advertisement and/or third party information appropriate for each individual user based on the input characteristics.

For example, for younger users of the online system 1, after authentication and identification 7 information has been received, the online system 1 may determine that based on the age of the individual using the system 1, that games and activities are inappropriate for that particular individual and will only let certain games and activities be accessed by that individual. Additionally, only certain advertisements 21 and promotional material will be presented to that younger individual. Moreover, the point system 25 and rewards 27 relating to online game play and participation may be limited to appropriate material for that individual.

As further illustrated in FIG. 1, after authentication and identification, the system may present the individual with a screen name 29 that may be utilized to help identify the user online and allow the user to communicate with other online users 31. Additionally, the point system 25 of the online system 1 may be allocated to that specific screen name 29 and/or user. The user may then be presented with a game menu 33 which may allow the individual to choose from a plurality of different games and activities which they may participate in.

After the individual has chosen a game or activity in which to participate, the individual will be routed to the appropriate website or menu allowing them to participate in the online activity. The individual may have a tool bar portion 35 which may inform the individual of possible points 39 that they may receive from any participation in any activity or for winning a game. Additionally, the tool bar 35 may have a counter 37 which may allow the individual to continuously know the amount of points they have accumulated to date and may show real time point awardment to that individual such that they may keep track of their total points 39 while playing or participating in the game.

Additionally, the system 1 may have a point total menu (not shown) whereby the point total menu may allow the individual to access all of their points 39 received for online play/participation. Moreover, the point total menu (not shown) may also show an entire history of points awarded and the reasoning behind all the points including length of play, awards for achievement and the like. The point total menu may allow the individual to purchase more points 39, trade points or give away points. Moreover, the point total menu may be linked to a rewards menu 41 whereby the individual may redeem their points for rewards from the rewards menu 41.

Figure 2:
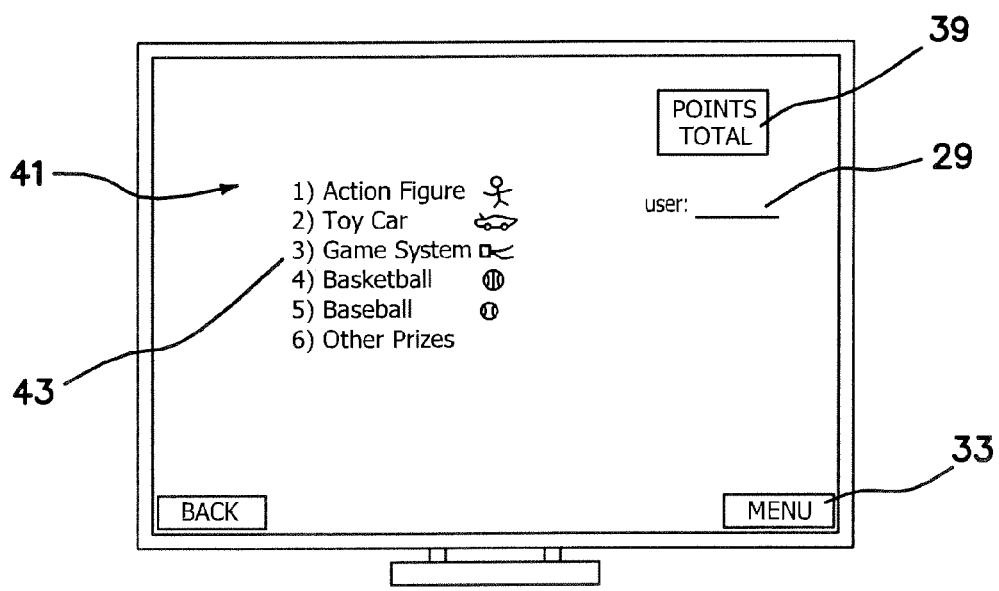
FIG. 2 is a screen shot of the system in an exemplary embodiment of the present invention.

As illustrated in FIG. 2, the rewards menu 41 may show a plurality of different awards 43 that may be awarded with the redemption of the individual's earned points 39 from the points total menu. The awards 43 are based on the information provided during the identification stage including gender 21, age 19, interests and the like. Thereby, the appropriate rewards 43 may be presented that would most likely be in line with the expectations of a particular individual of a specific subset relating to age 19, gender 21 and specific interests.

The individual may choose a reward 43 whereby the system 1 may inform the individual how many awards points 39 must be utilized in order to redeem for that particular prize. If the individual has the appropriate number of points 39 collected from game play and game achievement, the individual may redeem those collected points for presented prizes/rewards 43.

Figure 3:
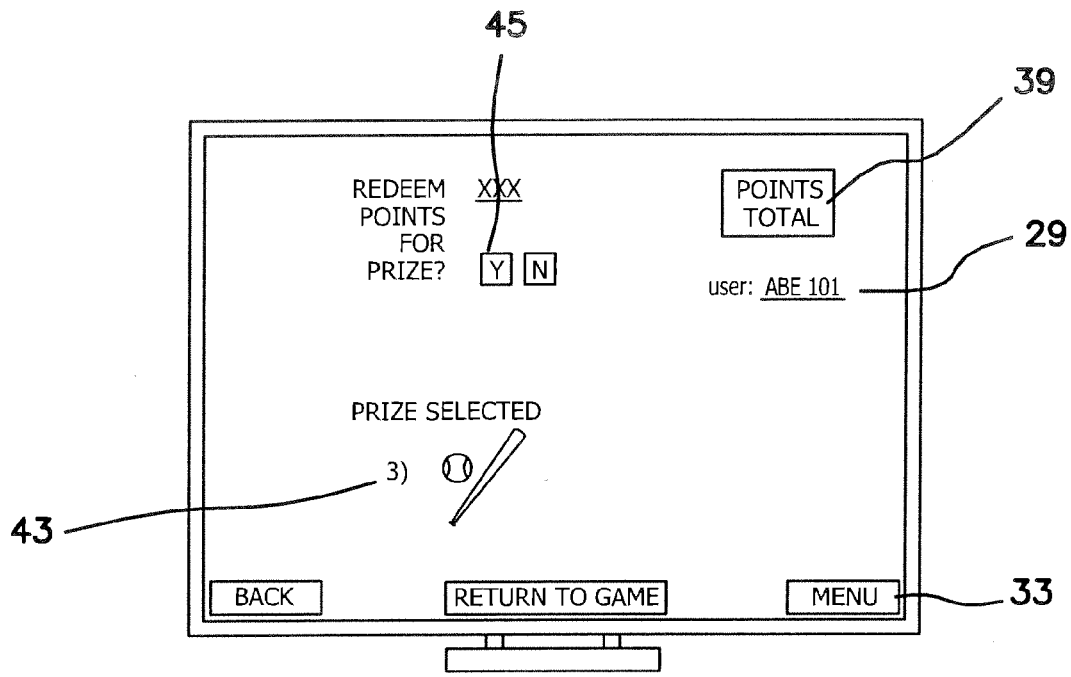
FIG. 3 is a screen shot of the system in an exemplary embodiment of the present invention.
Figure 4:
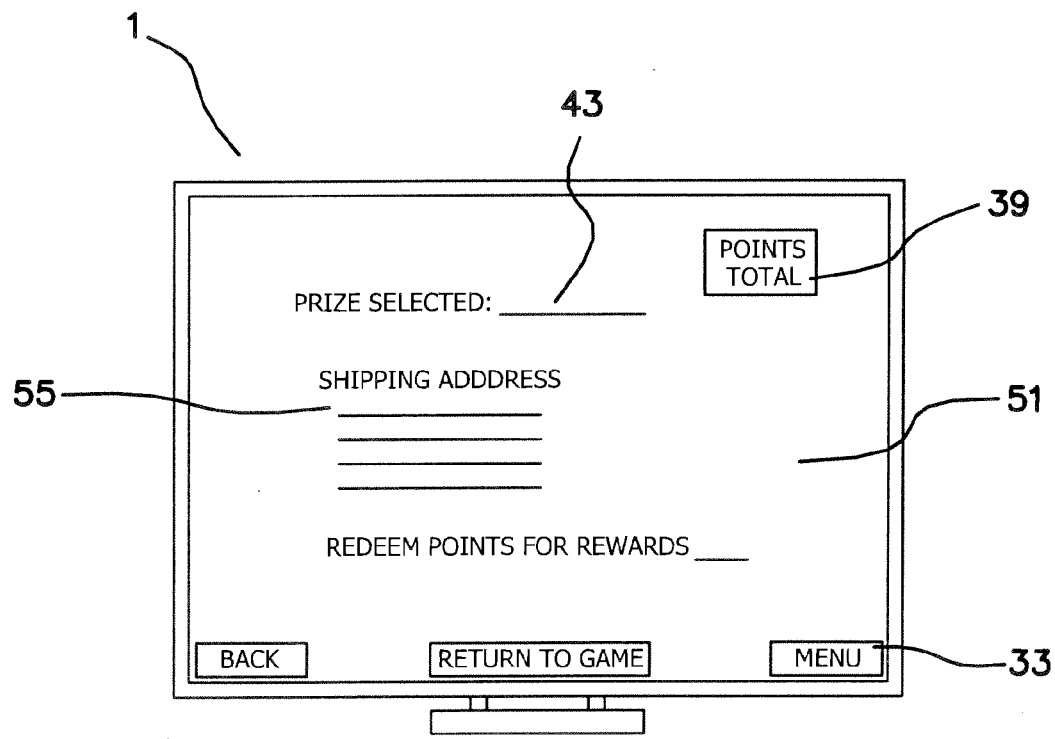
FIG. 4 is a screen shot of the system in an exemplary embodiment of the present invention.

FIG. 3 illustrates the user redeeming the collected points for prizes 43. After the individual has chosen a prize 43 and has decided to redeem his/her collected points 39 against that prize 43, the system 1 prompts the individual to confirm 45 that the individual wishes to redeem and utilize their points 39 in order to do so. With confirmation, the prize 43 is selected and the individual is taken to a sign out menu 51 shown in FIG. 4 which prompts the individual to enter shipping information 55 whereby the reward is shipped to the individual.

In an embodiment, if the individual does not have the appropriate number of points 39 in order to redeem for a prize 43, the system 1 may allow the individual to either buy the appropriate number of points 39 and/or may allow the individual to pay a prorated amount to redeem what points 39 they do have against the prize 43. Moreover, the system 1 may also calculate what amount of participation may be necessary in order to earn enough points 39 for redemption.

In an exemplary embodiment, the gaming system 1 may be utilized for a plurality of different applications including rewarding an individual for online reading. For example, in the situation of children of learning age, the system 1 and method may be utilized whereby the child would log onto the reward site, utilizing the same above-mentioned identification and authorization 7 process, and whereby the child would then receive rewards 43 for reading a book online whereby for each page read, the child is rewarded points for reading, and/or for a certain time period that the child is reading, they are rewarded points for participation. The system 1 may also calculate lengths for which normal reading would occur such that if an individual scrolled through the screen too quickly, no points would be rewarded. As previously stated, the child could then redeem points 39 accumulated during reading and/or learning sessions for certain prizes 43 in the system 1 and/or may be automatically sent specific prizes when a threshold point amount has been reached.

Thus, specific embodiments and applications of a gaming system have been disclosed. It should be apparent however, to those skilled in the art, that many more modifications besides those already described are possible without departing from the inventive concepts herein. The inventive subject matter, therefore, is not to be restricted except in the spirit of the appended claims. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of facilitating rewards for online participation, comprising:
   providing to a user a login menu that is executed on a computer and allows a user to log into the computer using a unique identification for each individual user, wherein the login menu is programmed to acquire from a user a set of parameters for online use;
   displaying a participation menu that utilizes the set of parameters to allow the user to select a participation activity;
   providing a point furnishing system whereby a user is furnished with points during the activity;
   displaying to a user a rewards menu for choice of a reward to the user; and
   providing a reward to an individual user whereby the reward is provided by a third party in exchange for advertising space on a website associated with the online participation activity.

2. The method of claim 1 wherein the set of parameters comprise an identification outline.

3. The method of claim 1 wherein the set of parameters comprise a plurality of personal information from an individual user and wherein for younger users, after authentication and identification information has been received, the method determines based on an age of the individual using the computer that games and activities are inappropriate for that particular individual and the method will only let certain games and activities be accessed by that individual and that only certain advertisements and promotional material will be presented to that younger individual.

4. The method of claim 1 wherein the participation menu comprises a plurality of online activities to participate in.

5. The method of claim 1 wherein the participation menu comprises a plurality of online games to participate in.

6. The method of claim 1 wherein the point furnishing system allows for accumulation of points in response to activity accomplishments.

7. The method of claim 1 wherein the point furnishing system allows for accumulation of points in response to a user's continuous online participation in an online activity.

8. The method of claim 1 further comprising a step of transferring information from the point furnishing system into the rewards menu such that information relating to points accumulated are displayed in the rewards menu.

9. The method of claim 1 wherein the rewards menu allows a user to utilize points from the point furnishing system to pick a reward from the rewards menu.

10. The method of claim 1 wherein the rewards menu has a plurality of different rewards that may be won by an individual online user whereby each reward has a point amount associated therewith.

11. The method of claim 9 wherein after a user has picked a reward from the rewards menu, the point furnishing system deducts the points needed to redeem the reward from the points accumulated by an individual user.

12. The method of claim 11 wherein the rewards system utilizes the login information received from the individual user to send the individual user the chosen reward.

13. The method of claim 1 wherein the reward is sent to the individual online user.

14. The system of claim 1 wherein the points system allocates to the individual user points which may be accumulated by the individual user for preset achievements.

15. A system for rewarding online participation by an individual user, the system comprising:

an authentication and identification menu whereby an individual user may input personal information and characteristics;

associating at least one of a plurality of said information to a participation menu whereby the participation menu reveals to the individual user certain activities to which they may participate;

a points system whereby points are allocated to the individual user for preset achievements;

an advertising portion advertising goods and services to the individual user; and a rewards system whereby prizes may be chosen from a rewards menu whereby the rewards system is associated with the advertising portion and a reward is provided to an individual user by a third party in exchange for advertising space on a website associated with the online participation activity.

16. The system of claim 15 wherein the system allows the user to select a participation activity and transfers the individual to the selected activity.

17. The system of claim 15 wherein the authentication and identification menu allows the user to identify personal likes and dislikes and whereby the system may forward this inputted information to the participation activity menu and the rewards system may thereby designate information that corresponds to the inputted information from the user.

18. The system of claim 14 wherein the preset achievements may be participation time, winning an activity, or answering a question correctly.

19. The system of claim 15 wherein the rewards system may have a plurality of prizes corresponding to preset point totals whereby a prize may be selected by a user if the user has accumulated the necessary amount of points.

20. The system of claim 15 further comprising a step of allowing the user to accumulate points awarded by the points system to redeem the same for prizes in the rewards system and whereby when a prize is selected from the rewards system, the prize is sent to the individual user in exchange for the accumulated points.

* * * * *